United States Patent [19]

Vogel

[11] Patent Number: 5,098,156
[45] Date of Patent: Mar. 24, 1992

[54] DOUBLE PASSENGER SEAT SUPPORT ARRANGEMENT

[75] Inventor: Ignaz Vogel, Karlsruhe, Fed. Rep. of Germany

[73] Assignee: Ignaz Vogel GmbH & Co., KG, Karlsruhe, Fed. Rep. of Germany

[21] Appl. No.: 541,065

[22] Filed: Jun. 20, 1990

[30] Foreign Application Priority Data

Feb. 22, 1990 [DE] Fed. Rep. of Germany ..... 90103398

[51] Int. Cl.⁵ ............................................. A47C 7/02
[52] U.S. Cl. .................................. 297/232; 297/440; 297/344
[58] Field of Search ............. 297/440, 232, 452; 248/225.1; 296/63

[56] References Cited

U.S. PATENT DOCUMENTS

| | | | |
|---|---|---|---|
| 3,636,342 | 1/1972 | Blount | 248/225.1 |
| 4,105,250 | 8/1978 | Caldwell | 297/445 |
| 4,226,394 | 10/1980 | Einhorn | 248/225.1 |
| 4,761,036 | 8/1988 | Vogel | 297/440 X |
| 4,901,971 | 1/1990 | Connelly | 248/225.1 |
| 4,909,464 | 3/1990 | Levine et al. | 248/225.1 |
| 4,927,020 | 5/1990 | Rondy | 248/225.1 |

*Primary Examiner*—Peter R. Brown
*Assistant Examiner*—Cassandra L. Hope

[57] ABSTRACT

In a double passenger seat support arrangement for use in land, water or air transports which comprises a seat support frame with spaced support legs interconnected by a support beam structure having spaced sets of box spar and mounting track structures, each such set has at least two mounting track structures arranged side-by-side and firmly connected to, or integral with, the associated box spar structure with one of the mounting track structures defining a downwardly open channel for mounting the support beam structure onto the legs and the other having an upwardly open channel for mounting the seats onto the support beam structure.

6 Claims, 2 Drawing Sheets

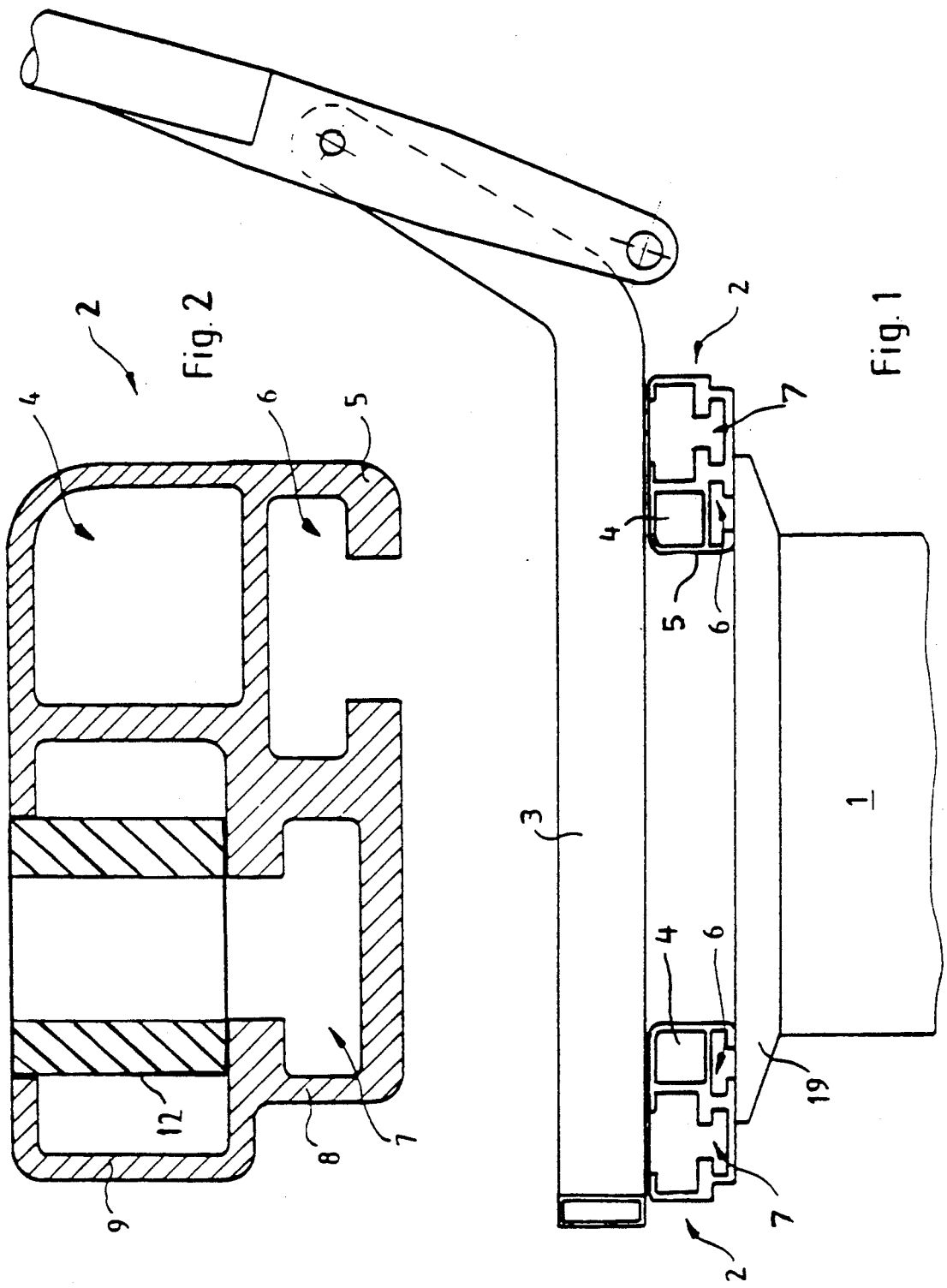

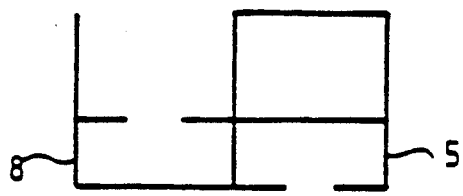
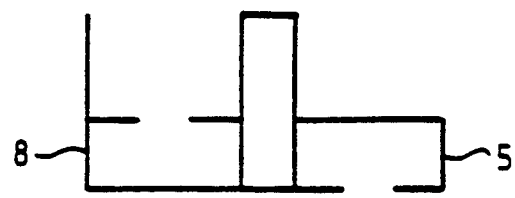
Fig. 3     Fig. 4
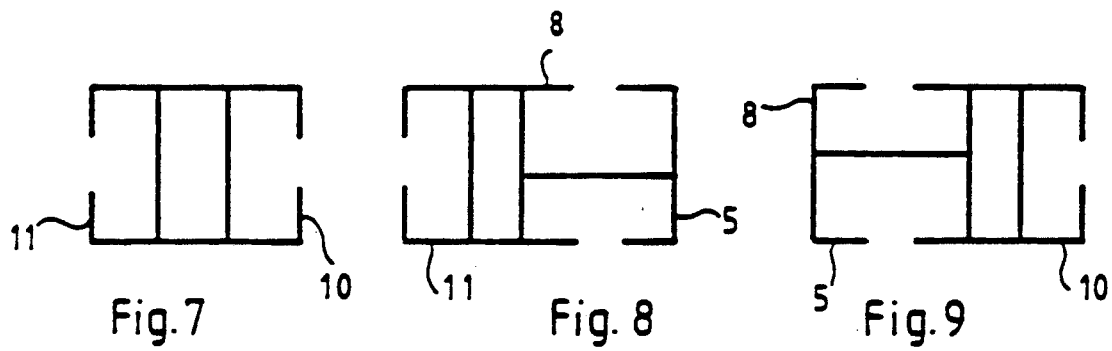
Fig. 5     Fig. 6
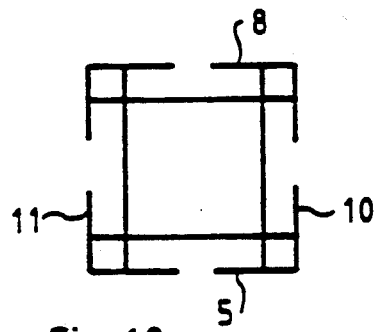
Fig. 7     Fig. 8     Fig. 9
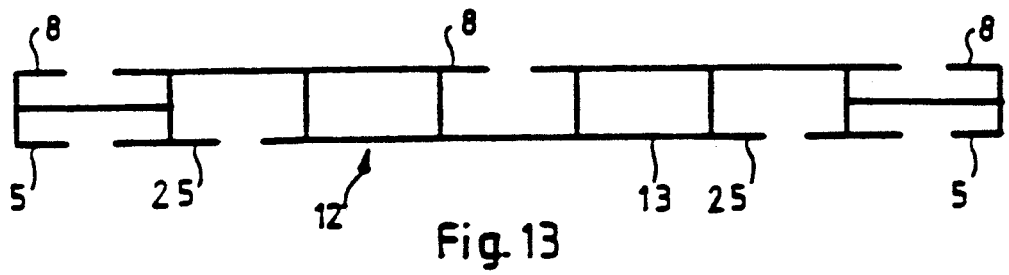
Fig. 10    Fig. 11    Fig. 12
Fig. 13

DOUBLE PASSENGER SEAT SUPPORT ARRANGEMENT

BACKGROUND OF THE INVENTION

The invention relates to a double passenger seat support arrangement for seat installations in buses, boats and airplanes which include a support base having at least two seats supported thereon with backrests mounted on the seats and at least one of the seats being transversely movable on the support base.

Like normal furniture seats, passenger seats for the transportation of people need to be comfortable and attractive in appearance but they also must be safe for their intended use. Vehicle passenger seats are subjected to substantially rougher wear and tear than furniture seats; they need to be very sturdy and yet they need to absorb impact energy resiliently and without breakage. They also should remain rattle-free over a long period of use and nevertheless they need to be light in weight. Another requirement is that the seats should be economic to manufacture and to operate by offering the possibility of exchanging any parts subject to wear. Furthermore, such passenger seats should be easy to mount and be adaptable to various space arrangements, and they should finally require only small volumes such that they can be easily shipped in knocked down state in large quantities.

None of the presently available passenger seats meets all these requirements. Generally passenger seats presently built are so rugged that they meet the strength requirements over their full projected life, that is, they remain rattle-free over a long time of use. This results in the construction of not only relatively heavy but also very expensive seats providing also for a relatively high dead weight of the vehicles equipped with such seats. Furthermore, such seats are generally manufactured in accordance with special requirements depending on a particular application.

In addition to the requirements mentioned above, passenger seats should be designed such that they can be arranged behind one another as closely as possible for economical reasons. Nevertheless there should be sufficient leg room for good seating comfort—in spite of a close spacing of the seats—for which the height of the space under the seats is responsible to a large degree. Since however, the height of the seating surface is essentially determined by the human anatomy and since the seats have to have a given minimum upholstery thickness, it is only possible to improve the leg room or rather the height of the space under a seat by making the laterally extending seat support structure as flat as possible.

It has been tried earlier to provide between two support legs a single lateral support beam which however must be very sturdy in order to meet all the requirements. However experience has shown that such a single beam, no matter how sturdy, cannot withstand the high torsional load to which it is exposed during an accident. Modern vehicle seat support arrangements include therefore always two spaced support structures or an especially formed plate structure extending between the support legs for supporting the seat members.

In determining the height of the seat support base also the height of the adjustment tracks which permits lateral position adjustment of at least one of the seats and which is arranged on top of the seat support base and below the seat members needs to be taken into consideration. A very good solution which generally meets all requirements is shown in U.S. Pat. No. 4,422,691. The arrangement presented therein utilizes two spaced parallel profiled beams which have a double C cross-section and extend across the base legs. This arrangement provides for two guide grooves for mounting bolts permitting connection thereof to the base legs and also to the seat members at any desired distance.

The two beams may even be reinforced by a plate structure extending between and interconnecting the beams. A disadvantage of this arrangement however is that the structure is relatively high which nevertheless cannot be avoided for reasons of stability and rigidity.

The arrangement as shown in U.S. Pat. No. 4,761,036 is considered to be an improvement in this respect in that sturdiness of a double C-shaped beam structure is obtained by embedding the C-shaped rods in a profile rod which includes two continuous closed box spars.

Since the rigidity of this beam structure is obtained mainly by the box spars the beam structure may be relatively low for a given load. But like in the previously described arrangement the adjustment tracks are disposed on top of the beam structure or the support plate so that the height of the complete arrangement including the height of the adjustment tracks is quite large since the height of the adjustment tracks has to be added to the height of the support beam structure, that is, the leg room is accordingly smaller.

It is the principal object of the present invention to provide an arrangement in which the support rod or plate structures are so formed that the total height of the support structure—with or without adjustment track—is very small such that the arrangement provides for improved leg room without losing the required rigidity.

SUMMARY OF THE INVENTION

To achieve these advantages a double passenger seat support arrangement in accordance with the present invention which comprises a support frame with spaced support legs interconnected by a support beam structure having spaced box spar and separate mounting track structures for adjustably mounting the support beam structure on the legs and the passenger seat onto the support beam structure, the mounting track structures are arranged side-by-side and firmly connected to, or integral with, the associated box spar structures. One of the mounting track structures is provided with a downwardly open channel adapted to receive a mounting means for mounting the support beam structure onto the legs and the other mounting track structure has an upwardly open channel adapted to receive mounting means for mounting the seats onto the support beam structure.

The mounting track structures are preferably of C-shaped cross-section—like in some prior arrangements—for the reception of the head of mounting bolts. But the support beams or plates may have other additional provisions for mounting such as ablong holes or through holes in order to provide for the possibility of special mounting of the seats or the mounting of additional seats if needed.

However the C-shaped mounting track structures are not disposed on top of one another as they are in prior arrangements but they are arranged side-by-side thereby providing for reduced height of the support beam. But since the height of the box spar structure is a determining factor for its bending resistance and since a certain bending resistance value is necessary for a certain needed rigidity, the height of the mounting track structure is generally noticeably smaller than that of the box spar structure in order to ensure that the profiled support beams or plates do not become too massive. Since this is generally the case, the adjustment tracks can be mounted on the mounting track structures and the seat components are mounted on the adjustment track and the box spar structure may have the height of the mounting track structure plus the height of the adjustment track structure without an increase in total height of the arrangement. As a result, the height of the support beam is relatively small providing for generous leg room but nevertheless the seat support structure meets all requirements, particularly with regard to the needed rigidity.

It is noted that especially in connection with the use of a profile plate, whose plate section also acts as a supporting or reinforcing structure, the mounting beam structure may be arranged below the box spar structure. In connection with support beams however the mounting track structure, whose mounting surface incidentally may be arranged at any desired angle with respect to the profile rod or the profile plate plane, should be arranged beside the box spar structure so as not to protrude below the underside of the box spar structure. Because of the desired rigidity the height of the box spar structure is preferably greater than its width and is at least as large as the height of the adjustment track structure. It also has been found to be advantageous that the support beam on which the seats are mounted includes a top cover which is adapted to surround the adjustment track structure. Such an arrangement not only covers the movable part of the adjustment track so as to prevent injuries to passengers but it also prevents soiling of the adjustment track for extended service-free operation.

SHORT DESCRIPTION OF THE DRAWINGS

FIG. 1 is a side view of a double passenger seat according to the invention;

FIG. 2 is an enlarged cross-sectional view of a profile rod;

FIGS. 3 to 12 show schematically various profile rod cross-sections; and

FIG. 13 is a schematic cross-sectional view of a profile plate structure.

DESCRIPTION OF A PREFERRED EMBODIMENT

As shown in FIG. 1 the support frame of a vehicle passenger seat includes support legs 1, profiled support beam structures 2 bridging the support legs 1 and box spar frames 3 serving as support for the seating members which are not shown in the drawing. The profiled support beam structure which is essentially oblong in cross-section comprises an integral box spar structure 4 with a first mounting track structure 5 of C-shaped cross-section arranged subadjacent the box spar structure 4. The mounting track structure defines a downwardly open channel 6 adapted to receive the heads of mounting bolts for mounting the beam structures 2 on girders 19 of the support legs 1. Adjacent the mounting track structure 5 the support beam structure is provided with a second mounting track structure 8 which is also C-shaped in cross-section but which defines a channel 7 that is open upwardly toward the box spar frame 3. Channel 7 also is adapted to receive the heads of mounting bolts which are not shown to simplify the drawings but which may be utilized for mounting adjustment tracks onto the support beam structures 2 which adjustment tracks would then carry the box spar frames 3. In place of such adjustment tracks, that is, particularly if seat adjustment is not needed or not desired, there may be provided spacer members 12.

Above the second mounting track structure 8 there is provided a cover structure 9 which conceals and shields the adjustment track or spacer members 12 mounted on the track structure 8 and which protects such an adjustment track from dust and dirt. FIGS. 3 to 12 show profiled connecting beam structures 2 of various cross-sections. In all figures reference numeral 5 designates the respective mounting track structures which are open downwardly toward the support legs 1 whereas the upwardly open mounting track structures are designated by the reference numeral 8. FIG. 5 shows an arrangement with a sidewardly projecting strip 14 which may be utilized for the mounting of certain seat components. FIGS. 7, 8, 9 and 10 show support beam structures with sidewardly arranged mounting track structures. In the arrangement according to FIGS. 11 and 12 there are provided mounting track structures which are arranged at certain angles with respect to the profiled support plate or the two support beams. Such an arrangement may be advantageous for the mounting of additional seating structures. Finally, FIG. 13 shows a profiled support plate structure 12 in which the mounting track structures 25, 28 are arranged at the ends of a reinforced plate structure 13 which has additional structures 5, 8 for the mounting of seat components.

What is claimed is:

1. Double passenger seat support arrangement for use in land, water or air transports comprising a seat support frame for supporting a number of seats with backrests mounted thereon, said seat support frame having spaced support legs, a support beam structure extending across said legs and including spaced sets of box spar and mounting track structures, each of said sets of box spar and mounting track structures having at least two mounting track structures arranged both at the same elevation and integral with the associated box spar structure, one of the mounting track structures having a downwardly open channel for mounting said support beam structure onto said legs and the other of said mounting track structures having an upwardly open channel for mounting said seats onto said support beam structure and being provided with a cover projecting upwardly from the mounting track structure so as to enclose an adjustment track mounted onto said mounting track structure.

2. A seat support arrangement according to claim 1, wherein said mounting track structures are C-shaped in cross-section.

3. A seat support arrangement according to claim 1, wherein said mounting track structures are arranged side-by-side and said box spar structure is disposed over the mounting track structure with downwardly open channel.

4. A seat support arrangement according to claim 1, wherein the mounting track structures are arranged on opposite sides of said box spar structure such that their lower edges are flush with the lower edges of the box spar structure.

5. A seat support arrangement according to claim 4, wherein the height of said box spar structure is greater than its width.

6. A seat support arrangement according to claim 1, wherein said box spar structure has a height at least as great as that of the mounting track structure.

* * * * *